United States Patent
Frenger et al.

(10) Patent No.: US 10,771,125 B2
(45) Date of Patent: Sep. 8, 2020

(54) FIRST COMMUNICATION DEVICE AND METHODS PERFORMED THEREBY FOR TRANSMITTING RADIO SIGNALS USING BEAMFORMING TO A SECOND COMMUNICATION DEVICE

(71) Applicant: Telefonaktiebolaget LM Ericsson (publ), Stockholm (SE)

(72) Inventors: Pål Frenger, Linköping (SE); Emil Björnson, Linköping (SE); Martin Hessler, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 15/531,581

(22) PCT Filed: Sep. 19, 2016

(86) PCT No.: PCT/SE2016/050873
§ 371 (c)(1),
(2) Date: May 30, 2017

(87) PCT Pub. No.: WO2018/052351
PCT Pub. Date: Mar. 22, 2018

(65) Prior Publication Data
US 2018/0294850 A1 Oct. 11, 2018

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0413* (2013.01); *H04B 7/0456* (2013.01); *H04B 7/0617* (2013.01)

(58) Field of Classification Search
CPC ...................................................... H04B 7/00
See application file for complete search history.

(56) References Cited

U.S. PATENT DOCUMENTS 9,674,836 B2 * 6/2017 Gormley ............... G01S 7/2813
2005/0249159 A1 * 11/2005 Abraham ............. H04B 7/0421
370/329
(Continued)

FOREIGN PATENT DOCUMENTS

WO 2006088400 A1 8/2006
WO 2010097758 A1 9/2010
(Continued)

OTHER PUBLICATIONS

Unknown, Author, "Advanced Link Adaptation for NR", 3GPP TSG RAN WG1 Meeting #85, R1-164382, Huawei, HiSilicon, Nanjing, China, May 23-26, 2016, 2 pages.
(Continued)

*Primary Examiner* — Andrew Lai
*Assistant Examiner* — Sumitra Ganguly
(74) *Attorney, Agent, or Firm* — Sage Patent Group

(57) ABSTRACT

Method performed by a first communication device (201) for adapting a pre-coder used by a second communication device (202) to transmit radio signals using beamforming to a third communication device (203). The first communication device (201), the second communication device (202), and the third communication device (203) operate in a wireless communications network (200). The first communication device (201) adapts (301), over a single time period of transmission of the radio signals, the pre-coder used by the second communication device (202) to transmit the radio signals to the third communication device (203) using beamforming. The adapting (301) is based on a change, over the single time period, in a state of a channel used to transmit
(Continued)

the radio signals. The state is measured by the second communication device (202).

24 Claims, 6 Drawing Sheets

(51) Int. Cl.
    *H04B 7/0413*        (2017.01)
    *H04B 7/0456*        (2017.01)

(56) References Cited

U.S. PATENT DOCUMENTS

| | | | | |
|---|---|---|---|---|
| 2009/0069054 | A1* | 3/2009 | Zangi | H04L 5/0058 455/562.1 |
| 2009/0143091 | A1* | 6/2009 | Kim | H04W 52/282 455/522 |
| 2011/0085507 | A1* | 4/2011 | Jongren | H04B 7/0413 370/329 |
| 2011/0274022 | A1* | 11/2011 | Chen | H04W 52/42 370/311 |
| 2012/0057545 | A1* | 3/2012 | Hariharan | H04L 1/1685 370/329 |
| 2013/0088950 | A1* | 4/2013 | Sahlin | H04W 24/06 370/210 |
| 2014/0126445 | A1* | 5/2014 | Chizgi | H04W 52/0229 370/311 |
| 2014/0133333 | A1* | 5/2014 | Liu | H04W 24/10 370/252 |
| 2014/0219199 | A1* | 8/2014 | Ji | H04W 88/08 370/329 |
| 2014/0274081 | A1* | 9/2014 | Comeau | H04B 7/026 455/450 |
| 2014/0301356 | A1* | 10/2014 | Wang | H04L 5/0046 370/330 |
| 2015/0131750 | A1 | 5/2015 | Xue et al. | |
| 2016/0100383 | A1* | 4/2016 | Simonsson | H04L 1/0015 455/450 |

FOREIGN PATENT DOCUMENTS

| | | | |
|---|---|---|---|
| WO | 2012112088 A1 | 8/2012 | |
| WO | WO-2012112088 A1 * | 8/2012 | ............ H04J 3/1694 |

OTHER PUBLICATIONS

Unknown, Author, "sPDCCH for shortened TTI", 3GPP TSG RAN WG1 Meeting #85, R1-165209, NTT Docomo, Inc., Nanjing, P.R. China, May 23-27, 2016, 5 pages.

* cited by examiner

FIRST COMMUNICATION DEVICE AND METHODS PERFORMED THEREBY FOR TRANSMITTING RADIO SIGNALS USING BEAMFORMING TO A SECOND COMMUNICATION DEVICE

TECHNICAL FIELD

The present disclosure relates generally to a first communication device and methods performed thereby for transmitting radio signals using beamforming to a second communication device. The present disclosure also relates generally to the second communication device and methods performed thereby for decoding radio signals received from the first communication device. The present disclosure further relates generally to a computer program product, comprising instructions to carry out the actions described herein, as performed by the first communication device, or by the second communication device. The computer program product may be stored on a computer readable storage medium.

BACKGROUND

Communication devices such as wireless devices are also known as e.g. User Equipments (UE), mobile terminals, wireless terminals and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP)) Long Term Evolution (LTE), network nodes, which may be referred to as eNodeBs or even eNBs, may be directly connected to one or more core networks. All data transmission is in LTE controlled by the radio base station.

3GPP LTE radio access standard has been written in order to support high bitrates and low latency both for uplink and downlink traffic.

Multi-antenna techniques may significantly increase the data rates and reliability of a wireless communication system. The 5th Generation (5G) technology, which is currently being developed, incorporates the use of beamforming. Beamforming may be understood as a signal processing technique which relies on combining elements in an array antenna in such a way that signals at particular angles experience constructive interference while others experience destructive interference. The beams used may typically be highly directive and provide gains of 20 decibels (dB) or more since so many antenna elements may participate in forming a beam. An array antenna may consist of many antenna elements to achieve a large array gain. Many antenna elements may participate in forming a beam, and the beams are typically highly directive, giving beamforming gains of 20 decibels (dB) or more. Each Transmission Point (TP) may, by use of an array antenna, generate transmission of a large number of beams having different pointing direction and/or polarization. The transmission of a signal is performed over multiple antenna elements and applying individual complex weights to these antenna elements, such that the signal is basically intended for a single wireless device or terminal position. Precoding may be understood as a process by which incoming data may be distributed over each antenna port. Hence, precoding may be interpreted as multiplying a signal with different beamforming weights for each antenna port prior to transmission. A precoding vector contains the complex beamforming weights these antenna elements are to use for transmission. By applying precoding to all antennas, the base station may make constructive interference among signals at the locations of the intended terminals, and destructive almost everywhere else. Furthermore, as the number of antennas increases, the energy may be focused with extreme precision into small regions in space. The result is spatial selectivity, such that beamforming may be understood as a way to transmit a signal with such narrow beams that it is intended for a single wireless device or a group of wireless devices in a similar geographical position. In 5G systems, the number of antenna elements at the transmitter and/or receiver side may be significantly increased compared to common 3G and 4G systems.

Multi-antenna techniques may significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. In the 5th Generation (5G) technology, which is currently being developed, massive Multiple-Input Multiple-Output (MIMO) is one of the best candidate technologies for the radio physical layer. Massive MIMO, which may also be known as large-scale antenna systems and very large MIMO, may be understood as a multi-user MIMO technology where each BS may be equipped with a large number of antenna elements, at least 50, which may be used to serve many terminals that share the same time and frequency band and are separated in the spatial domain.

Beamforming, as well as massive MIMO, may operate in Time Division Duplex (TDD) mode. In TDD mode, a single carrier frequency may be used for uplink and downlink transmissions, and uplink and downlink transmissions are separated in the time domain on a cell basis. In reciprocity based TDD systems, the link from a transmitter to a received may match the link from the receiver to the transmitter, such that the estimated channel at the transmitter may directly be used for adaptive signal processing. The channel impulse responses may be understood to be the same in both uplink and downlink, since uplink and downlink transmissions occur in the same carrier, Channel reciprocity may allow the BSs to acquire Channel State Information (CSI) from pilot sequences transmitted by the terminals in the uplink. This CSI may then be useful for both the uplink and the downlink, avoiding the need to rely on CSI reporting from the terminals themselves.

Reciprocity based Time Division Duplex (TDD) systems are of particular interest in a $5^{th}$ Generation (5G) context, since massive MIMO may rely on them. Reciprocity based beamforming relies on accurate Channel State Information at the Transmitter (CSI-T). In case the number of transmit antennas is significantly larger than the number of receive antennas, as may be the case in a TDD massive MIMO downlink scenario, then the CSI-T may be efficiently obtained by transmission of Sounding Reference Signal (SRS) in the reverse link.

FIG. 1 is a schematic representation of the two steps of reciprocity based beamforming in a massive MIMO system. In step one, CSI acquisition at the BS via Sounding Reference Signal (SRS), the UEs send an uplink Sounding Reference Signal (SRS) and the base station measures on the SRS:s and calculates the beamforming parameters for each user. This is shown in the top figure. The second step, reciprocity based downlink and uplink beamforming, is shown in the bottom figure. In the second step, the beamforming weights obtained by the first step are used.

In the context of a massive MIMO, there are many more BS antennas than terminals; for example, twice as many, but ideally as many as possible. Massive MIMO may offer many benefits over conventional multi-user MIMO. First, conventional multi-user MIMO is not a scalable technology, since it has been designed to support systems with roughly equal numbers of service antennas and terminals, and relies on Frequency Division Duplex (FDD) operation. In the case of FDD operation, there may be two carrier frequencies, one for uplink transmission and one for downlink transmission. By contrast, in massive MIMO, with the large excess of service antennas over active terminals, TDD operation may bring huge improvements in throughput and radiated energy efficiency. On the one hand, these benefits result from the aggressive spatial multiplexing achieved by appropriately shaping the signals sent out and received by the base station antennas.

Other benefits of massive MIMO may include use of simple low-power components, since massive MIMO relies on simple signal processing techniques, reduced latency, and robustness against intentional jamming.

On the other hand, by operating in TDD mode, massive MIMO may exploit the channel reciprocity property.

By virtue of the law of large numbers, according to which the sum of a large number of random values in a sample approaches the mean value of the population, the effective scalar channel gain, that is the path gain including beamforming gain, seen by each terminal is close to a deterministic constant. The fact that the effective channel gain is kept constant long term, is called channel hardening. Thanks to the channel hardening, the terminals may reliably decode the downlink data using only long-term statistical CSI, making most of the physical layer control signaling redundant, and therefore resulting in the so-called low-cost CSI acquisition. This renders the conventional resource allocation concepts unnecessary and results in a simplification of the Media Access Control (MAC) layer. These benefits have elevated massive MIMO to a central position in preliminary 5G discussions.

However, the performance of systems relying on CSI acquisition via channel reciprocity, such as TDD beamforming and massive MIMO, may be affected by some limiting factors. First, channel reciprocity requires hardware calibration. Second, a basic phenomenon which is so-called pilot contamination effect may profoundly limit the performance of massive MIMO systems. Theoretically, every terminal in a massive MIMO system may be assigned an orthogonal uplink pilot sequence. However, the maximum number of orthogonal pilot sequences that may exist is upper-bounded by the size of the coherence interval. The coherence interval may be understood as is the time-frequency interval in which a channel is more or less the same. The coherence interval is the product of the coherence time and coherence bandwidth, which may be understood as the amount of time and the frequency bandwidth, respectively, in which the channel is more or less the same. Hence, adopting orthogonal pilots leads to inefficient resource allocation as the number of the terminals increases or it is not physically possible to perform when the coherence interval is too short. As a consequence, pilots may need to be reused across cells, or even within the home cell, for higher cell density. This inevitably causes interference among terminals which share the same pilot. Pilot contamination does not vanish as the number of BS antennas grows large, and so it is the one impairment that remains asymptotically.

Additional limiting factors further compromise the performance of systems relying on channel reciprocity.

SUMMARY

It is an object of embodiments herein to enable the improvement of the performance of link adaptation by communication devices in a wireless communications network.

According to a first aspect of embodiments herein, the object is achieved by a method performed by a first communication device. The method is for adapting a pre-coder used by a second communication device to transmit radio signals using beamforming to a third communication device. The first communication device, the second communication device, and the third communication device operate in a wireless communications network. The first communication device adapts, over a single time period of transmission of the radio signals, the pre-coder. The pre-coder is used by the second communication device to transmit the radio signals to the third communication device using beamforming. The adapting is based on a change, over the single time period, in a state of a channel used to transmit the radio signals. The state is measured by the second communication device.

According to a second aspect of embodiments herein, the object is achieved by a method performed by the third communication device. The method is for decoding the radio signals received from the second communication device. The second communication device, and the third communication device operate in a wireless communications network. The third communication device receives an indication from the second communication device. The indication is of at least one of: an adapted pre-coder used by the second communication device to transmit the radio signals to the third communication device using beamforming, an adapted modulation, an adapted coding scheme, and an estimated variation of a Signal to Interference Noise Ratio (SINR) of a channel used to transmit the radio signals. The at least one of: the adapted pre-coder, the adapted modulation, the adapted coding scheme and the estimated variation of the SINR is based on the change, over the single time period of transmission of the radio signals, in a state of the channel. The state has been measured by the second communication device. The third communication device also decodes the radio signals based on the received indication.

According to a second aspect of embodiments herein, the object is achieved by the first communication device configured to adapt the pre-coder. The pre-coder is configured to be used by the second communication device to transmit the radio signals using beamforming to the third communication device. The first communication device, the second communication device, and the third communication device are configured to operate in the wireless communications network. The first communication device is configured to adapt, over the single time period of transmission of the radio signals, the pre-coder. The pre-coder is configured to be used by the second communication device to transmit the radio signals to the third communication device using beamforming. To adapt is configured to be based on the change, over the single time period, in the state of a channel used to transmit the radio signals. The state is configured to be measured by the second communication device.

According to a fourth aspect of embodiments herein, the object is achieved by the third communication device configured to decode the radio signals configured to be received from the second communication device. The second communication device and the third communication device are configured to operate in the wireless communications network. The third communication device is configured to receive the indication from the second communication device. The indication is of at least one of: the adapted pre-coder configured to be used by the second communication device to transmit the radio signals to the third communication device using beamforming, the adapted modulation, the adapted coding scheme, and the estimated variation of the SINR of the channel configured to be used to transmit the radio signals. The at least one of: the adapted pre-coder, the adapted modulation, the adapted coding scheme and the estimated variation of the SINR are configured to be based on the change, over a single time period of transmission of the radio signals, in the state of the channel. The state has been configured to be measured by the second communication device. The third communication device is further configured to decode the radio signals based on the received indication.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the third communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the third communication device.

By the first communication device adapting the pre-coder used by the second communication device over the single time period of transmission, based on the change in the state of the channel as measured by the second communication device, the second communication device is enabled to perform link adaption independently of an optimal periodicity of transmission of uplink pilots from e.g., the third communication device. Hence, resources used for increasing the periodicity of the uplink pilots may be spared. In consequence, energy is saved, latency is reduced and capacity of the network is increased.

By the third communication device decoding the radio signals based on an indication received form the second communication device 202 on the adapted pre-coder, modulation, coding scheme and/or the estimated variation of the SINR, the third communication device is in turn enabled to make more accurate log-likelihood calculations of the soft bit reliability. That it is, the third communication device is in turn enabled to more adequately calculate soft bit information to be used in the further decoding processing in the receiver, and make a more accurate decision on whether a retransmission is necessary or not.

BRIEF DESCRIPTION OF THE DRAWINGS

Examples of embodiments herein are described in more detail with reference to the accompanying drawings, in which.

DETAILED DESCRIPTION

Figure 1:
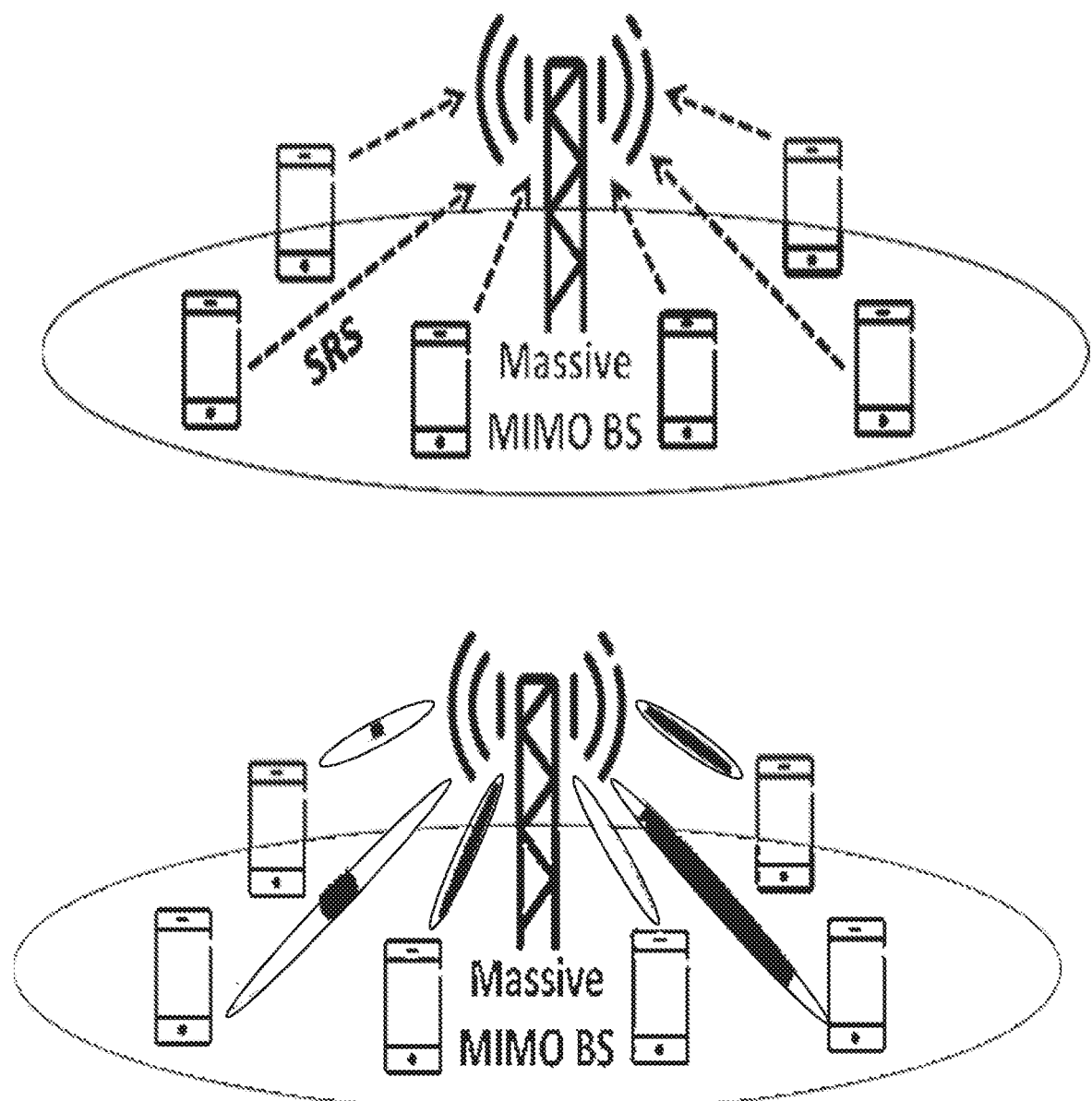
FIG. 1 is a schematic representation of CSI acquisition at the BS via SRS, top, and reciprocity based downlink and uplink beamforming, bottom, in a massive MIMO system

As part of the development of the embodiments disclosed herein, a problem associated with existing methods will first be identified and discussed.

Further to the limiting factors described earlier for the performance of systems, such as TDD beamforming and massive MIMO, which rely on CSI acquisition via channel reciprocity, the required periodicity of uplink pilots may depend on the coherence time of the radio channel, which in turn may depend on the speed of a UE. To illustrate the problem SRS are used herein as an example of uplink pilots. High speed UEs may need a high periodicity of SRS transmissions, as the channel condition may change more rapidly as the UE moves in space, whereas low speed UEs may be better served by lower SRS periodicity, since the channel condition is not as likely subject to change in a same location, and therefore energy, time, and resources may be saved by transmitting and processing fewer SRS.

In a TDD system serving a multitude of users, the network may need to select one single SRS periodicity. This single SRS periodicity may only be optimum for UEs with a particular channel coherence time, and sub-optimum for all other UEs. When reverting the channel from downlink to uplink to enable UEs to transmit SRS, the base station may need to be quiet to prevent interference with the uplink signals. Therefore, uplink pilot transmissions are associated with wasted time-frequency resources that could otherwise be used for downlink transmissions. Furthermore, the base station may need to insert additional guard intervals in the time domain to account for the propagation delay, which further increases the cost of transmitting SRS in terms of used time-frequency resources. In a multi-cell TDD system, the SRS periodicity selection in one node may be affected by SRS periodicity selection in a nearby node. Typically, the same SRS pattern may need to be used also in surrounding nodes to avoid problematic interference situations.

The selection of SRS periodicity in a radio network is a therefore a trade-off. While high SRS periodicity may provide good performance for high speed UEs at the cost of high SRS overhead, for low speed UEs, low SRS periodicity suffers from CSI-T aging of high speed UE, which leads to a significant Signal-to-Interference-plus-Noise Ratio (SINR) degradation, but results in good performance for low speed UEs.

In existing state-of-the-art methods, it is hence not possible to select an SRS periodicity that will be optimal for all UEs in the network. As a consequence, the link adaptation a node may carry out to transmit to the UEs will not be optimized, and the performance of the network will consequently be negatively affected.

Embodiments herein address the above mentioned shortcomings. Embodiments herein circumvent the lack of an optimal SRS periodicity by providing a method that enables the optimization of the performance of link adaptation in transmitting nodes, without the need to rely on a particular periodicity of the SRS.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Any reference herein to the terms "first", "second" or "third" will be understood to refer a manner of distinguishing between different instances of the terms they may modify. "First", "second", or "third" are not intended to confer a cumulative or chronological meaning to the terms they modify.

Figure 2:
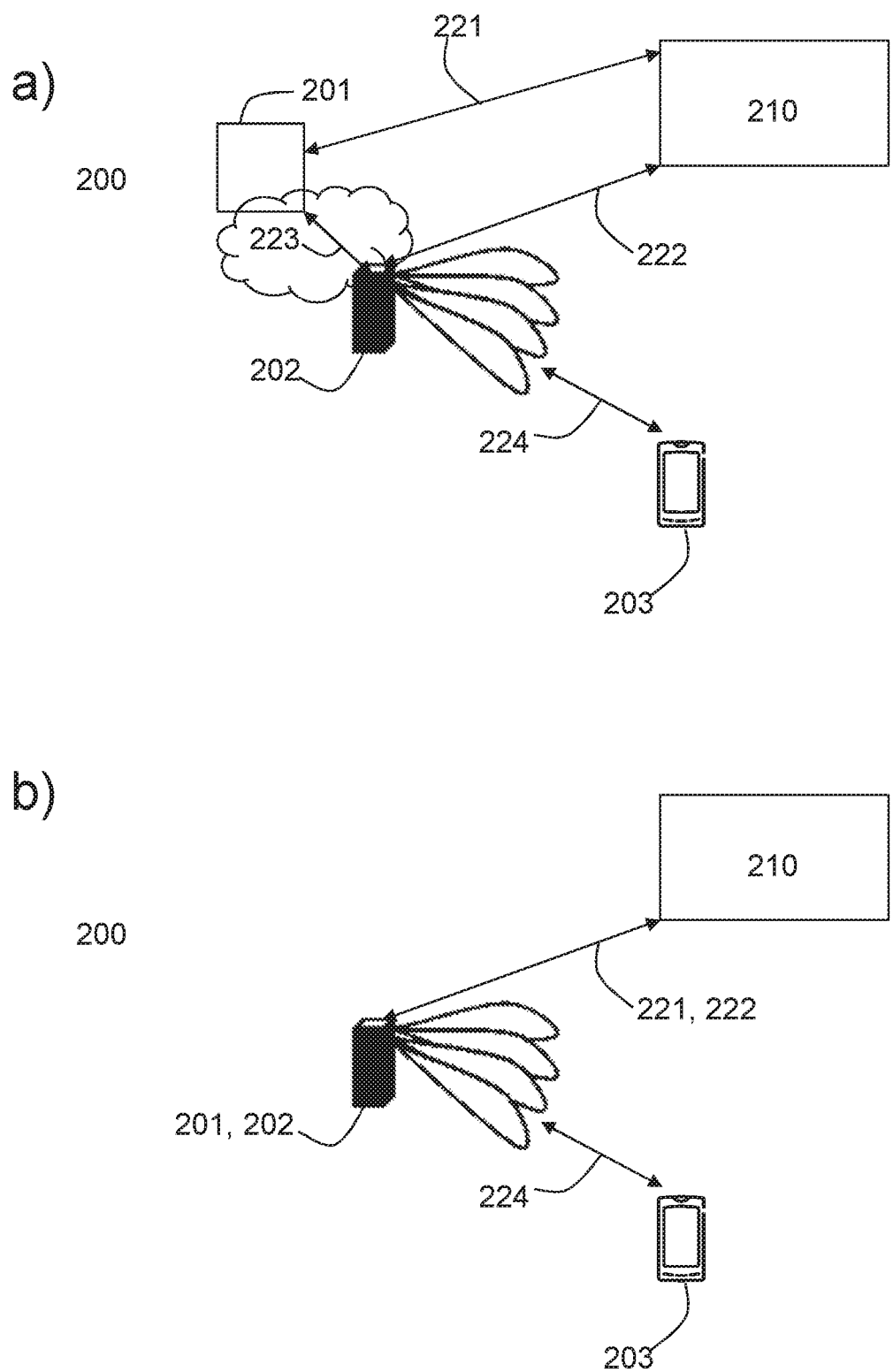
FIG. 2 is a schematic diagram illustrating two non-limiting examples, a) and b), of a wireless communications network, according to some embodiments.

FIG. 2 depicts two non-limiting examples of a wireless communications network 200, sometimes also referred to as a radio system, radio network or wireless communications system, in which embodiments herein may be implemented. The wireless communications network 200 may be a network using TDD and beamforming, and relying on acquisition of downlink channel information, such as Channel State Information (CSI), via channel reciprocity based on uplink pilot signals, such as SRS, sent by wireless devices. In particular embodiments, the wireless communications network 200 may be a massive MIMO system. The wireless communications network 200 may for example be a Long-Term Evolution (LTE) network, such as an LTE Time Division Duplex (TDD) network, or an LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP)) network, WiFi network, Worldwide Interoperability for Microwave Access (WiMax), 5G system or any wireless network or system. Thus, although terminology from LTE may be used in this disclosure to exemplify embodiments herein, this should not be seen as limiting the scope of the embodiments herein to only the aforementioned system. Other wireless systems may also benefit from exploiting the ideas covered within this disclosure. Thus, note that terminology such as eNodeB and UE should be considering non-limiting.

The wireless communications network 200 comprises a plurality of communication devices whereof a first communication device 201, a second communication device 202, and a third communication device 203 are depicted in FIG. 2 a). The first communication device 201 is a network node controlling the actions of the second communication device 202, which is a radio network node as described below. In some non-limiting examples, such as that depicted in the non-limiting example of FIG. 2a, the first communication device 201 and the second communication device 202 may be implemented in a so-called cloud solution, where the first communication device 201 may be a so-called virtual node or virtual machine controlling the actions of the second communication device 202. The first communication device 201 may also be implemented in a distributed fashion, wherein the actions described herein as being performed by the first communication device 201 may actually be performed by one or more processors from different nodes communicating in the cloud. In other examples, the first communication device 201 may be, e.g., a core network node, such as, e.g., Mobility Management Entity (MME), Self-Optimizing/Organizing Network (SON) node, a coordinating node, positioning node, Minimization of Drive Test (MDT) node, etc . . . .

In some other embodiments, as shown in FIG. 2 b), the first communication device 201 may be the same as the second communication device 202, in which case the first communication device 201 and the second communication device 202 may be a same radio network node.

The wireless communications network 200 comprises a plurality of radio network nodes whereof the second communication device 202 is depicted in FIGS. 2a and 2b, The second communication device 202 is a radio network node with beamforming capability. In some embodiments, the radio network node may be a base station, such as e.g., an eNB, eNodeB, or a Home Node B, a Home eNodeB, femto Base Station, BS, Transmission Point, Radio Access Point, Remote Radio Unit (RRU), Remote Radio Head (RRH), or any other network unit capable to serve a wireless device or a machine type communication device in the wireless communications network 200 using beamforming. In such embodiments, the second communication device 202 may be e.g., a Wide Area Base Station, Medium Range Base Station, Local Area Base Station and Home Base Station, based on transmission power and thereby also coverage size. The second communication device 202 may be a stationary relay node or a mobile relay node. The second communication device 202 may support one or several communication technologies, and its name may depend on the technology and terminology used. The second communication device 202 may serve receiving nodes such as the third communication device 203, with serving beams.

In 3GPP LTE, any of the first communication device 201 and the second communication device 202 may be directly connected to one or more networks 210.

The first communication device 201 may communicate with the one or more networks 230 over a first link 221. The second communication device 202 may communicate with the one or more networks 230 over a second link 222.

In other embodiments, the radio network node with beamforming capability may be a wireless device. A wireless device, such as a UE, may be also known as e.g. mobile terminal, wireless terminal and/or mobile station, mobile telephone, cellular telephone, or laptop with wireless capability, just to mention some further examples. The wireless device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, Customer Premises Equipment (CPE) or any other radio network unit capable of communicating over a radio link in the wireless communications network 200. The wireless device may be wireless, i.e., it may be enabled to communicate wirelessly in the wireless communication network 200. The communication may be performed e.g., between two devices, between a device and a regular telephone and/or between a device and a server. The communication may be performed e.g., via a RAN and possibly one or more core networks, comprised within the wireless communications network 200.

A number of wireless devices may be located in the wireless communications network 200. In the example scenario of FIGS. 2a and 2b, only one wireless device is shown: the third communication device 203. The third communication device 203 may be a wireless communication device, as just described.

The first communication device 201 may communicate with the second communication device 202 over a third link 223, which may be a radio link or a wired link. The second communication device 202 may communicate with the third communication device 203 over a fourth link 224, which may be a radio link.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 3:
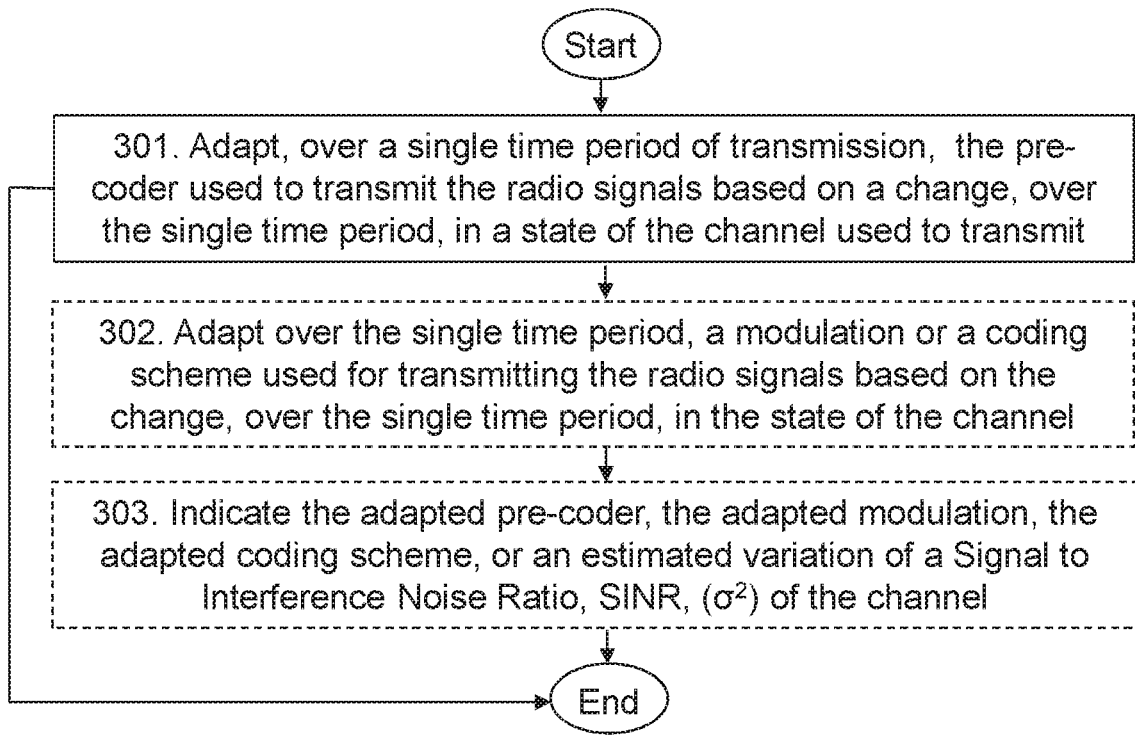
FIG. 3 is a schematic flowchart illustrating a non-limiting example of a method in a first communication device, according to some embodiments.

Embodiments of a method performed by the first communication device 201 for adapting a pre-coder used by the second communication device 202 to transmit radio signals using beamforming to the third communication device 203, will now be described with reference to the flowchart depicted in FIG. 3. The first communication device 201, the second communication device 202, and the third communication device 203 operate in the wireless communications network 200. In FIG. 3, optional actions are indicated by dashed lines.

The method may comprise one or more of the following actions. In some embodiments all the actions may be performed. In some embodiments, one or more actions may be performed. One or more embodiments may be combined, where applicable. All possible combinations are not described to simplify the description. Note that in some embodiments, the order of the Actions may be changed.

Action 301

In order to allow the second communication device 202 to perform adaptation of the fourth link 224, without needing to rely on the periodicity of the uplink pilots, e.g., SRS, transmitted by the third communication device 203 being optimal, in this Action, the first communication device 201, taking advantage of the channel reciprocity, adapts, over a single time period of transmission of the radio signals, the pre-coder used by the second communication device 202 to transmit the radio signals to the third communication device 203 using beamforming. The adapting in this Action 301 is based on a change, over the single time period, in a state of a channel used to transmit the radio signals. The state is measured by the second communication device 202.

Adapting the pre-coder may be understood herein as changing the pre-coder used from a first pre-coder to a second pre-coder. Alternatively, adapting the pre-coder may be understood herein as making one or more changes in one or more variables or parameters in the pre-coder used by the second communication device 202.

For example, if $\hat{H}$ considered to be the estimate of the M×K matrix of the channel used to transmit the radio signals between the second communication device 202 and the third communication device 203, wherein M is a number of transmit antennas in the second communication device 202 and K is a number of receiving communication devices such as the third communication device 203, which may be referred to herein as third communication devices, which have 1 transmit antenna, the Minimum Mean Squared Error (MMSE)/Regularized Zero-Forcing (RZF) pre-coder may take the form $\hat{H}(\hat{H}^H\hat{H}+\rho I_K)^{-1}$, appropriately normalized. An MMSE/RZF pre-coder may be understood as a pre-coder adapted to minimize statistical error as well as to null multiuser interference signals. The MMSE/RZF pre-coder may be understood to be of the form $\hat{H}(\hat{H}^H\hat{H}+\rho I_K)^{-1}$, which may be appropriately normalized.

In the pre-coder formula just provided, the parameter ρ may depend on the Signal-to-Noise Ratio (SNR) and on the channel estimation quality. For example, high SNR and high estimation quality may lead to a small ρ, and vice versa. If the estimation quality is gradually degraded during the downlink transmission, e.g., because the third communication device 203 may be moving at high speed, this may be partially compensated for by the first communication device 201 gradually increasing ρ. In the extreme case, it may be possible go from ρ=0, which may give ZF precoding, that is, assuming noise free operation, in the beginning of a downlink transmission, to a large ρ such that $\hat{H}^H\hat{H}+\rho I_K \approx \rho I_K$, which may give maximum ratio (MR) precoding at the end of the downlink transmission. MR precoding may be understood as a technique applied to combine the multiple received signals of a diversity reception device into a single improved signal. If there are multiple third communication devices, the channels degrade differently for different third communication devices, then this may also be included in the precoding computation by appropriate modification of the regularization term ρ. Regularized zero-forcing precoding may be understood as an enhanced processing to consider the impact on a background noise and unknown user interference. In addition, the power allocation between third communication devices may also be gradually modified.

According to the forgoing, in particular some embodiments, the adapting 301 of the pre-coder may comprise changing the value of ρ in the formula: $\hat{H}(\hat{H}^H\hat{H}+\rho I_K)^{-1}$ wherein:

$\hat{H}$ is an estimate of a matrix of the channel. A matrix of the channel may be understood as comprising elements $a_{m,n}$ representing the channel coefficients between the $m^{th}$ transmit and $n^{th}$ receive antenna elements;

$I_K$ is an interference matrix of the Kth communication device, the third communication device 203 in this case. An interference matrix may be understood as comprising elements $i_{m,n}$ representing the received interference on the channel between the $m^{th}$ transmit and $n^{th}$ receive antenna elements; and ρ is a scalar value. A scalar value may be understood as a numerical value smaller than infinity. According to embodiments herein, ρ may be increased by the first communication device 201 during the single time period of transmission, e.g., a downlink TTI, in order to reflect an increasing uncertainty of the channel knowledge at the transmitter. By adapting ρ such that ρ=0, first communication device 201 may effectively obtain a zero-forcing (ZF) pre-coding.

By adapting ρ by selecting a very large value of ρ, first communication device 201 may approach maximum ratio (MR) preceding. The rate at which the first communication device 201 may increase ρ may depend on a speed of the Kth communication device, e.g., third communication device 203.

In alternative examples, instead of using a pre-coder defined according to $\hat{H}(\hat{H}^H\hat{H}+\rho I_K)^{-1}$, appropriately normalized, the first communication device 201 may replace $\rho I_K$ with a diagonal matrix whose elements may reflect the effective SNR for each individual terminal, that is, for each of the third communication devices, taking into account degradation due to CSI outdating.

In other examples, the adapting in this Action 301 may be performed by, e.g., retrieving the second pre-coder from a memory.

As described earlier, the wireless communications network 200 may be, in some embodiments, an LTE network. Therefore, in some embodiments, the single time period may be a single TTI. However, as one of skill in the art will recognize, the name of the single time period of transmission may change between different standards and releases. TTI is therefore to be considered a non-limiting example of the single time period of transmission.

Similarly, the state of the channel may be, in some embodiments a CSI in LTE. The state of the channel may be understood as one or more conditions of the channel for radio transmission, which may indicate the quality of the radio transmission, e.g., the success of the radio transmission.

The state of the channel may be measured by the second communication device 202 based on pilot signals, e.g., SRS, transmitted by the third communication device 203. By the adapting of the pre-coder being performed over a single time period of transmission, the periodicity of transmission of the SRS may become less relevant, as the adapting may be performed over a period which is too short to involve more than a single SRS transmission.

As described earlier, in some examples, the first communication device 201 and the second communication device 202 may be distributed nodes, wherein the second communication device 202 is the radio network node making the measurements of the pilot signals transmitted by the third communication device 203, and the first communication device 201 may obtain these measurements, e.g., via the third link 223, and may then adapt the pre-coder by one or more of: a) obtaining, that is calculating, determining, deriving, etc . . . . , any changes that may need to be made to the current pre-coder used by the second communication device 202, and b) sending an indication to the second communication device 202 to implement the obtained adaptation, e.g., via the third link 223.

In other examples, as also described above, the first communication device 201 may be the same device as the second communication device 202. In such examples, adapting the pre-coder may comprise any one or more of: a) obtaining any changes that may need to be made to the current pre-coder and b) implementing the obtained adaptation.

Also in some embodiments, the second communication device 202 may use beamforming with massive MIMO.

In some particular embodiments, the adapting 301 of the pre-coder may be performed simultaneously for a group of communication devices served by the second communication device 202, which is not represented in FIG. 2 for the sake of simplicity. This group of communication devices may be referred to herein as third communication devices. The simultaneous transmission may be performed, for example, to enhance the system capacity.

Action 302

As the quality of the channel between the second communication device 202 and the third communication device 203 degrades, and the pre-coder is adapted by the first communication device 201, the expected SINR at the receiver may also degrade. This may be compensated for by the first communication device 201 adapting the coding or modulation, e.g., a Modulation and Coding Scheme (MCS) over the single time period of transmission as the channel uncertainty grows. Hence, in order to allow the second communication device 202 to further improve the effectivity of the transmissions, that is the throughput, while at the same time making sure that the transmissions to the third communication device 203 are of sufficient quality, the first communication device 201 may, in this action, adapt, over the single time period, at least one of: a modulation and a coding scheme used for transmitting the radio signals to the third communication device 203. The adapting 302 of the at least one of: the modulation and the coding scheme may be based on the change, over the single time period, in the state of the channel.

Adapting one of the modulation and the coding scheme may be understood here as changing from a first modulation to a second modulation, and/or from a first coding scheme to a second coding scheme. For example, when the condition of the channel is good, according to some criterion, a higher order modulation and coding scheme may be selected for use by the second communication device 202. When the condition of the channel is poor, according to the same or another criterion, a lower order modulation and coding scheme may be selected.

As described for Action 302, in examples wherein the first communication device 201 and the second communication device 202 may be distributed nodes, the first communication device 201 may adapt the at least one of: the modulation and the coding scheme by one or more of: a) obtaining, any changes that may need to be made to the current modulation and/or coding scheme used by the second communication device 202, and b) sending an indication to the second communication device 202 to implement the obtained adaptation, e.g., via the third link 223.

In other examples, the first communication device 201 may be the same device as the second communication device 202. In such examples, adapting the modulation and/or coding scheme may comprise any one or more of: a) obtaining any changes that may need to be made to the current modulation and/or coding scheme and b) implementing the obtained adaptation.

In particular examples in LTE, the foregoing may be expressed as that as the CSI-T degrades and the pre-coder is adapted, the expected SINR at the receiver, the third communication device 203, may also degrade. This may be compensated for by adapting the modulation and coding scheme over the TTI.

In case the DL transmission from the second communication device 202 may comprise multiple code-words, then the first communication device 201 may adapt the MCS according to the expected SNR degradation over the single time period of transmission, e.g., the single TTI, on a codeword by codeword basis. As the SNR degrades over time, this may be compensated by using more robust modulation and coding. The benefit of performing the adaptation of the MCS on a codeword by codeword basis may be understood as that approximately the same decoding error probability may be kept.

From an information-theoretic perspective, the codewords may optimally span the entire downlink transmission, and preferably multiple downlink slots, in order to distribute and therefore minimize the probability of transmission errors. However, if the downlink transmission is anyway divided into blocks that are decoded one at a time, then each of them may optimally have a coding rate that matches the current channel conditions, Consequently, the downlink block may be divided into pieces where the channel codes with different rates, or even different modulation schemes, may be applied.

More specifically, if the following slot structure is considered

UUUUUUUUU     DDDDDDDD     (U=uplink, D=downlink)→

→time

Nominally, one codeword may span over all D-symbols. However, since the SINR may degrade with time, the first D-symbols may have a better SINR than the latter. Hence, in a first option, the modulation may be adapted along the time axis, reducing, for example, from 16-QAM to X-QAM where X<16, not necessarily a regular uniform constellation, According to a second option, the D-symbols may be partitioned as follows

UUUUUUUUU $D_1$ $D_1$ $D_1$ $D_1$ $D_2$ $D_2$ $D_2$ $D_2$ where $D_1$ may belong to a first codeword with rate $R_1$ and $D_2$ may belong to a second codeword with rate $R_2$ and $R_2 < R_1$.

According to the foregoing, in some embodiments, the adapting 302 of the at least one of the modulation and the coding scheme may be performed on a codeword by codeword basis.

This action is optional.

Action 303

In the receiver of the third communication device 203, the SINR may degrade faster than expected due to the pre-coder adaptation performed by the first communication device 201, which may then be used by the second communication device 202. The third communication device 203 may be able to accurately predict the rate at which the channel may change, at least in the presence of sufficient amounts of downlink pilots, but it may be more difficult for the third communication device 203 to know how fast the pre-coder is adapted. This may be problematic, e.g., when calculating soft-bits for the channel decoder in the receiver of the third communication device 203. The soft-bits may be understood as numerical values that enable the estimation of the occurrence of an error in a received transmission. The second communication device 202 may therefore provide the third communication device 203 with additional side-information related to the expected overall channel change rate.

To decode, the third communication device 203 may need to compute the log-likelihood value, or soft bit value, for each information bit. On the scalar channel, that is, with one transmission and one reception antenna, with additive Gaussian noise, this likelihood may be provided by:

$$\frac{\log(P(b=1|y))}{\log(P(b=0|y))} = \frac{2y}{\sigma^2}$$

for a given bit b, where y is the channel output and $\sigma^2$ is the noise variance. On a channel with interference, $\sigma^2$ may be proportional to the sum of the interference and noise power. If the channel degrades due to time-variation, the SINR may change: e.g., it may be higher at the beginning of the downlink sub-frame as compared to at its end. The second communication device 202 may be able to predict how the SINR ($\sigma^2$) may vary, based on "experience" and on estimates of the channel coherence. According to embodiments herein, the second communication device 202 may therefore inform the third communication device 203 about how the SINR ($\sigma^2$) may vary within the downlink sub-frame, using an appropriate control channel message, for example, so that the third communication device 203 may normalize its log-likelihoods appropriately. The third communication device 203 may also estimate this SINR, but the first communication device 201 may know more about its expected time-variation and, hence, there may be added value in the second communication device 202 informing the third communication device 203 about this.

According to the foregoing, in order to inform the third communication device 203 about expected SINR variations, e.g., caused by pre-coder adaptation, or about the p adaptation rate, and therefore enable the third communicadevice 203 to make more accurate log-likelihood calculations of the soft bit reliability, in some embodiments wherein the first communication device 201 is the second communication device 202, the first communication device 201 may indicate to the third communication device 203 at least one of: the adapted pre-coder, the adapted modulation, the adapted coding scheme, and an estimated variation of a Signal to Interference Noise Ratio, SINR, e.g., SINR $\sigma^2$, of the channel.

Because in some embodiments the first communication device 201 may be a different node than second communication device 202, as shown in FIG. 2a, the indicating of this Action 303 may be performed by sending an instruction, via e.g., the third link 223, to the second communication device 202 to send the indication to the third communication device 203. That is, in some examples, indicating may be understood as initiating an indication of the at least one of: the adapted pre-coder, the adapted modulation, the adapted coding scheme, and an estimated variation of a Signal to Interference Noise Ratio, SINR, e.g., SINR $\sigma^2$, of the channel.

In the embodiments wherein the first communication device 201 is the same as the second communication device 202, the indicating may be implemented by sending or transmitting the indication using an appropriate control channel message on a physical control channel.

This action is optional.

Figure 4:
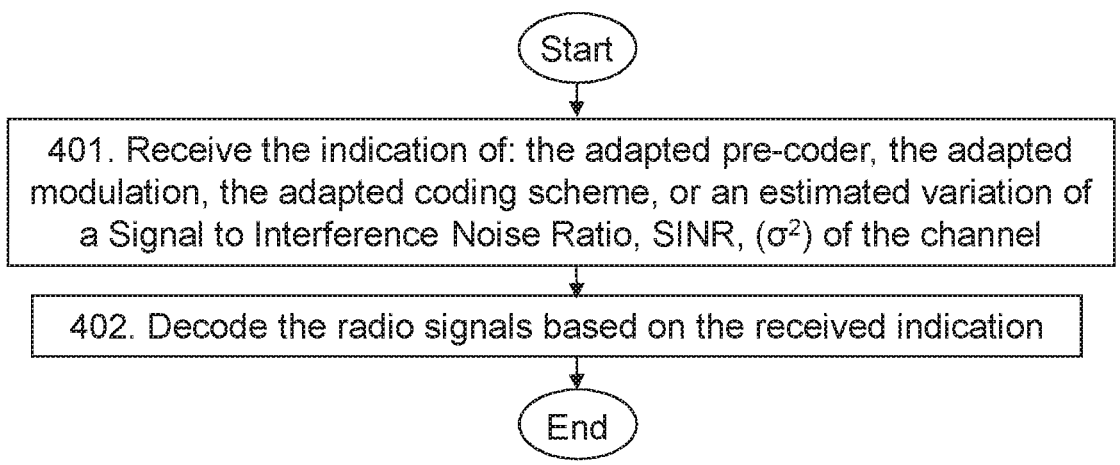
FIG. 4 is a schematic flowchart illustrating a non-limiting example of a method in a third communication device, according to some embodiments.

Embodiments of a method performed by the third communication device 203 for decoding radio signals received from the second communication device 202, will now be described with reference to the flowchart depicted in FIG. 4. The second communication device 202 and the third communication device 203 operate in the wireless communications network 200.

The detailed description of some of the following corresponds to the same references provided above, in relation to the actions described for the first communication device 201, and will thus not be repeated here. For example, the wireless communications network 200 may be an LTE network, and the single time period may be a single TTI.

Action 401

In order to allow the third communication device 203 to learn about expected SINR variations, e.g., caused by pre-coder adaptation, or about the $\rho$ adaptation rate, and therefore enable the third communication device 203 to make more accurate log-likelihood calculations of the soft bit reliability, in this Action, the third communication device 203, receives the indication from the second communication device 202 described in Action 303. The indication is of at least the one of: a) the adapted pre-coder used by the second communication device 202 to transmit the radio signals to the third communication device 203 using beamforming, b) the adapted modulation, c) the adapted coding scheme, and c) the estimated variation of the SINR, e.g., SINR $\sigma^2$, of the channel used to transmit the radio signals. The at least one of: the adapted pre-coder, the adapted modulation, the adapted coding scheme and the estimated variation of the SINR is based on the change, over the single time period of transmission of the radio signals, in the state of the channel. The state has been measured by the second communication device 202.

The indication may be received using an appropriate control channel message using a physical control channel, via the fourth link 224.

In some embodiments, the adapted pre-coder may comprise a change in the value of $\rho$ in the formula: $\hat{H}(\hat{H}^H\hat{H}+\rho I_K)^{-1}$, wherein:

$\hat{H}$ is the estimate of the matrix of the channel, $I_K$ is the interference matrix of the third communication device 203, and $\rho$ is the scalar value.

In some embodiments, the state of the channel is a CSI in LTE, and the beamforming used for the transmission of the radio signals to the third communication device 203 is with massive MIMO.

Action 402

The third communication device 203 may, in this action, decodes the radio signals received from the second communication device 202, based on the received indication in Action 401.

Figure 5:
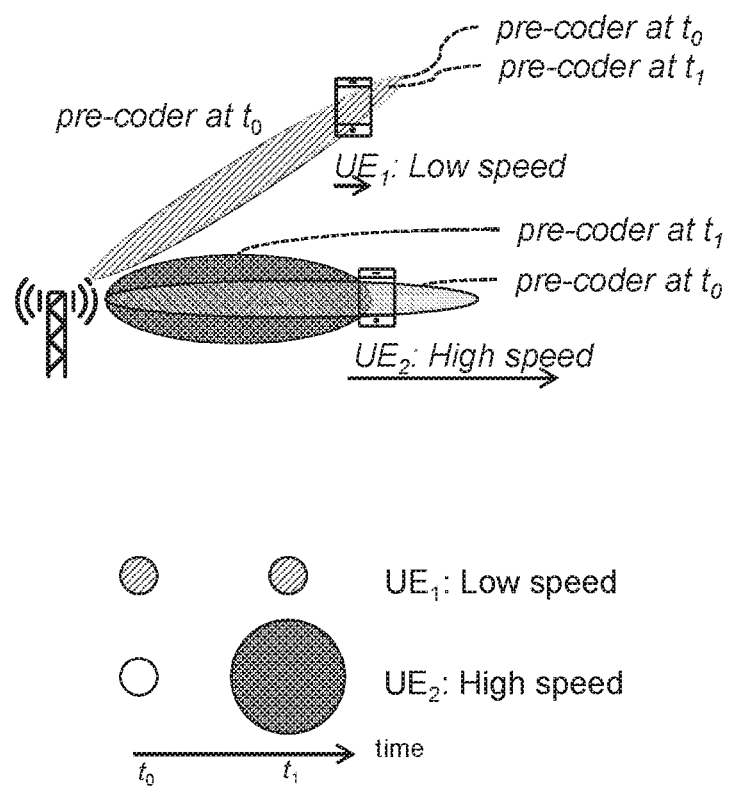
FIG. 5 is a schematic flowchart illustrating a non-limiting example of a method in a first communication device, according to some embodiments.

FIG. 5 illustrates a non-limiting example scenario where the method described herein may be utilized. In this particular example, the first communication device 201 is the same as the second communication device 202, a BS. The second communication device 202 is serving two third communication devices, in this example two UEs: $UE_1$ which is a low speed UE and $UE_2$ with is a high speed UE. As a result of the UE speed, the channel state information at the transmitter (CSI-T) degrades over the over the single time period of transmission, here a single TTI. To combat this effect, the base station gradually adjusts the pre-coder from the narrow beam and well-focused beam at the beginning of the TTI, at time $t_0$, to a more wide-beam and less focused beam at the end of the TTI, at time $t_1$. The amount of pre-coder adaptation performed may depend on the expected degradation of the CSI-T during the TTI, and hence the first communication device 201 may adapt the pre-coder to a much smaller extent for $UE_1$, which moves at low speed, compared to for $UE_2$, which moves at high speed.

To summarize the foregoing in other words, according to embodiments herein, a coherence interval may be better utilized by adapting the transmitter and receiver to the loss of coherence. Hence a set of third communication devices, e.g., UEs, may jointly be addressed more efficiently over a coherence interval. This may be achieved by the first communication device 201 adapting the pre-coder and adapting the transmission over time, and hence also informing at least one the receivers, e.g., the third communication device 203, of this adaptation. Particular embodiments herein may be understood to relate to Massive MIMO pre-coder adaptation and signalling to combat CSI-T aging.

One benefit of the embodiments herein is that they provide higher system throughput compared to existing methods. This is because embodiments herein enable link adaptation to be performed more often and dynamically, based on the quality of the channel used for transmission.

Another benefit of the embodiments herein is that they require lower overhead for uplink pilots, e.g., SRS. This is because embodiments herein allow the transmitting communication device to not rely on the periodicity of transmission of the uplink pilots. Since in some cases, the periodicity of transmission of the uplink pilots may no longer need to be increased, pilot contamination may also be reduced, or its increase avoided, in comparison with existing methods.

To perform the method actions described above in relation to FIGS. 3 and/or 5, the first communication device 201 is configured to adapt the pre-coder, the pre-coder being configured to be used by the second communication device 202 to transmit the radio signals using beamforming to the third communication device 203. The first communication device 201 comprises the following arrangement depicted in FIG.

6. As already mentioned, the first communication device 201, the second communication device 202, and the third communication device 203 are configured to operate in the wireless communications network 200.

The detailed description of some of the following corresponds to the same references provided above, in relation to the actions described for the first communication device 201, and will thus not be repeated here.

The first communication device 201 is configured to, e.g., by means of an adapting module 601 configured to, adapt, over the single time period of transmission of the radio signals, the pre-coder configured to be used by the second communication device 202 to transmit the radio signals to the third communication device 203 using beamforming. To adapt is configured to be based on the change, over the single time period, in the state of the channel used to transmit the radio signals, the state being configured to be measured by the second communication device 202.

The adapting module 601 may be a processor 603 of the first communication device 201.

In some embodiments, the wireless communications network 200 may be an LTE network, and the single time period is a single TTI.

The state of the channel may be a CSI in LTE, and the second communication device 202 may be configured to use beamforming with massive MIMO.

In some embodiments, to adapt the pre-coder may comprise to change the value of $\rho$ in the formula: $\hat{H}(\hat{H}^H\hat{H}+\rho I_K)^{-1}$, wherein $\hat{H}$ is an estimate of a matrix of the channel, and $I_K$ is an interference matrix of the third communication device 203, and $\rho$ is a scalar value.

To adapt the pre-coder may be configured to be performed simultaneously for a group of communication devices served by the second communication device 202.

In some embodiments, first communication device 201 may be further configured to, e.g., by means of the adapting module 601 configured to, adapt, over the single time period, at least one of: the modulation and the coding scheme configured to be used for transmitting the radio signals to the third communication device 203, to adapt the at least one of: the modulation and the coding scheme being configured to be based on the change, over the single time period, in the state of the channel.

To adapt the at least one of the modulation and the coding scheme may be configured to be performed on a codeword by codeword basis.

In some embodiments wherein the first communication device 201 may be the second communication device 202, the first communication device 201 may be further configured to, e.g., by means of an indicating module 602 configured to, indicate to the third communication device 203 at least one of: the adapted pre-coder, the adapted modulation, the adapted coding scheme, and the variation of the SINR, e.g., SINR $\sigma^2$, of the channel, the variation being configured to be estimated.

The indicating module 602 may be the processor 603 of the first communication device 201.

Figure 6:
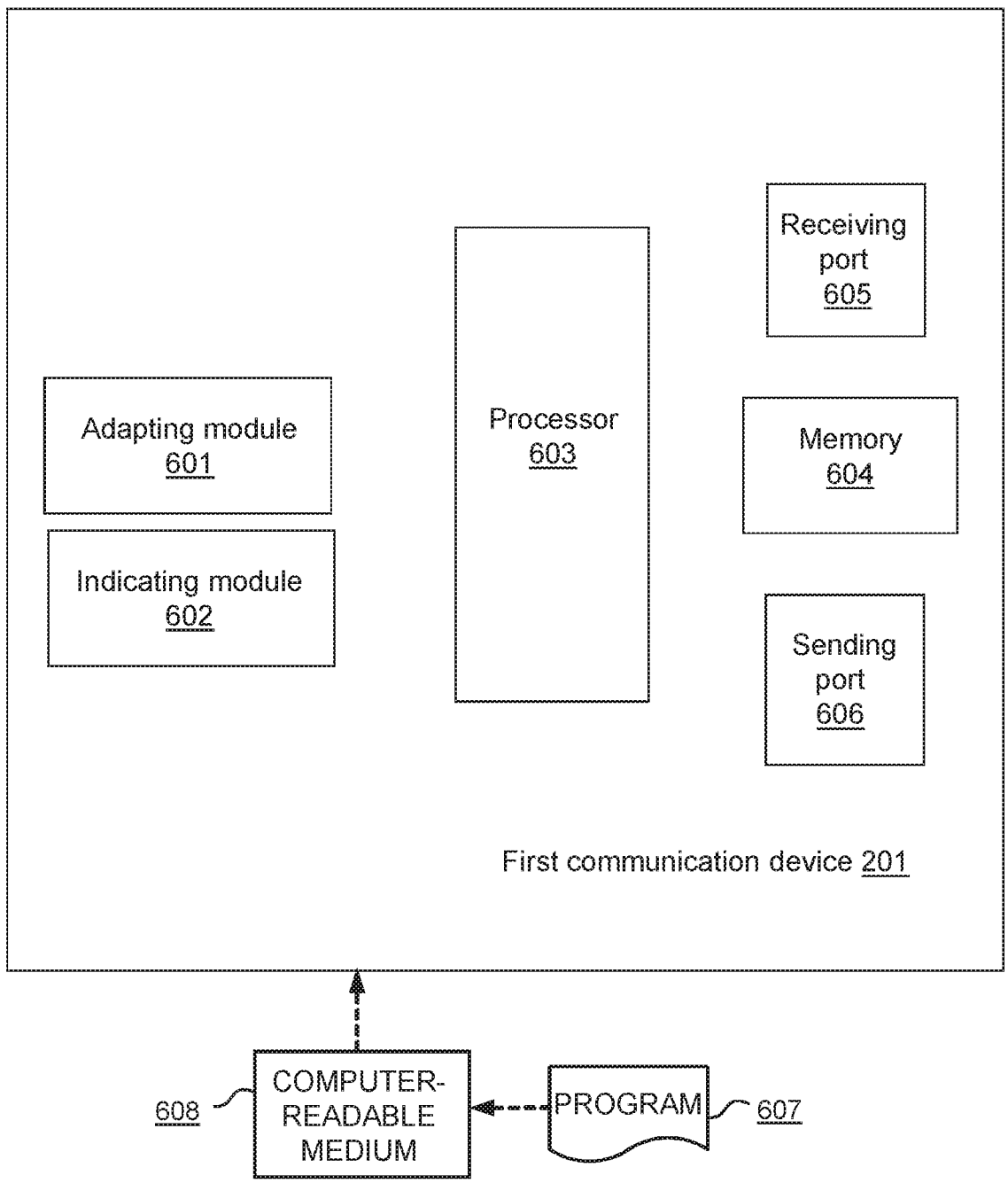
FIG. 6 is a block diagram illustrating embodiments of a first communication device, according to some embodiments.

The embodiments herein to adapt the pre-coder being configured to be used by the second communication device 202 to transmit the radio signals using beamforming to the third communication device 203 may be implemented through one or more processors, such as the processor 603 in the first communication device 201 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first communication device 201. One such carrier may be in the form of a CD ROM disc. It is however feasible with other data carriers such as a memory stick. The computer program code may furthermore be provided as pure program code on a server and downloaded to the first communication device 201. The computer program code may also be provided as a service from the cloud. As indicated above, the processor 603 may comprise one or more circuits, which may also be referred to as one or more modules in some embodiments, each configured to perform the actions carried out by the first communication device 201, as described above in reference to FIG. 6, e.g., the adapting module 601, and the indicating module 602. Also, in some embodiments, the adapting module 601, and the indicating module 602 described above may be implemented as one or more applications running on one or more processors such as the processor 603.

The first communication device 201 may further comprise a memory 604 comprising one or more memory units. The memory 604 may be arranged to be used to store obtained information, such as the information received by the processor 603, store data configurations, scheduling, and applications etc. to perform the methods herein when being executed in the first communication device 201. The memory 604 may be in communication with the processor 603. Any of the other information processed by the processor 603 may also be stored in the memory 604.

In some embodiments, information e.g., from the second communication device 202 or the third communication device 203, may be received through a receiving port 605. The receiving port 605 may be in communication with the processor 603. The receiving port 605 may also be configured to receive other information.

The processor 603 may be further configured to send messages, e.g., to the second communication device 202 or the third communication device 203, through a sending port 606, which may be in communication with the processor 603, and the memory 604.

Those skilled in the art will also appreciate that the any module within the first communication device 201, e.g., the adapting module 601, and the indicating module 602 described above, may refer to a combination of analog and digital circuits, and/or one or more processors such as the processor 603 configured with software and/or firmware, e.g. stored in the memory 604, that when executed by the one or more processors such as the processor 603, perform actions as described above, in relation to FIG. 3. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Pursuant to the foregoing, the methods according to the embodiments described herein for the first communication device 201 may be respectively implemented by means of a computer program 607 product, comprising instructions, i.e., software code portions, which, when executed on at least one processor 603, cause the at least one processor 603 to carry out the actions described herein, as performed by the first communication device 201, The computer program 607 product may be stored on a computer-readable storage medium 608. The computer-readable storage medium 608, having stored thereon the computer program 607, may comprise instructions which, when executed on at least one processor 603, cause the at least one processor 603 to carry out the actions described herein, as performed by the first communication device 201. In some embodiments, the computer-readable storage medium 608 may be a non-transitory computer-readable storage medium, such as a CD ROM disc, a memory stick, or stored in the cloud space. In other embodiments, the computer program 607 product may be stored on a carrier containing the computer program, wherein the carrier is one of an electronic signal, optical signal, radio signal, or the computer-readable storage medium 608, as described above.

To perform the method actions described above in relation to FIG. 4, the third communication device 203 is configured to decode the radio signals configured to be received from the second communication device 202. The third communication device 203 comprises the following arrangement depicted in FIG. 7. As already mentioned, the second communication device 202 and the third communication device 203 are configured to operate in the wireless communications network 200.

The detailed description of some of the following corresponds to the same references provided above, in relation to the actions described for the third communication device 203, and will thus not be repeated here.

The third communication device 203 is configured to, e.g., by means of an receiving module 701 configured to, receive the indication from the second communication device 202, the indication being of at least one of: the adapted pre-coder configured to be used by the second communication device 202 to transmit the radio signals to the third communication device 203 using beamforming, the adapted modulation, the adapted coding scheme, and the estimated variation of the SINR, e.g., SINR $\sigma^2$, of the channel configured to be used to transmit the radio signals. The at least one of: the adapted pre-coder, the adapted modulation, the adapted coding scheme and the estimated variation of the SINR are configured to be based on the change, over the single time period of transmission of the radio signals, in the state of the channel. The state has been configured to be measured by the second communication device 202.

The receiving module 701 may be a processor 703 of the third communication device 203.

In some embodiments, the wireless communications network 200 may be an LTE network, and the single time period is a single TTI.

The state of the channel may be a CSI in LTE, and the beamforming configured to be used for the transmission of the radio signals to the third communication device 203 may be with massive MIMO.

In some embodiments, the adapted pre-coder may comprise a change in the value of $\rho$ in the formula: $\hat{H}(\hat{H}^H\hat{H}+\rho I_K)^{-1}$, wherein $\hat{H}$ is the estimate of the matrix of the channel, $I_K$ is the interference matrix of the third communication device 203, and $\rho$ is the scalar value.

In some embodiments, the third communication device 203 may be further configured to, e.g., by means of a decoding module 702 configured to, decode the radio signals based on the received indication.

The decoding module 702 may be the processor 703 of the third communication device 203.

Figure 7:
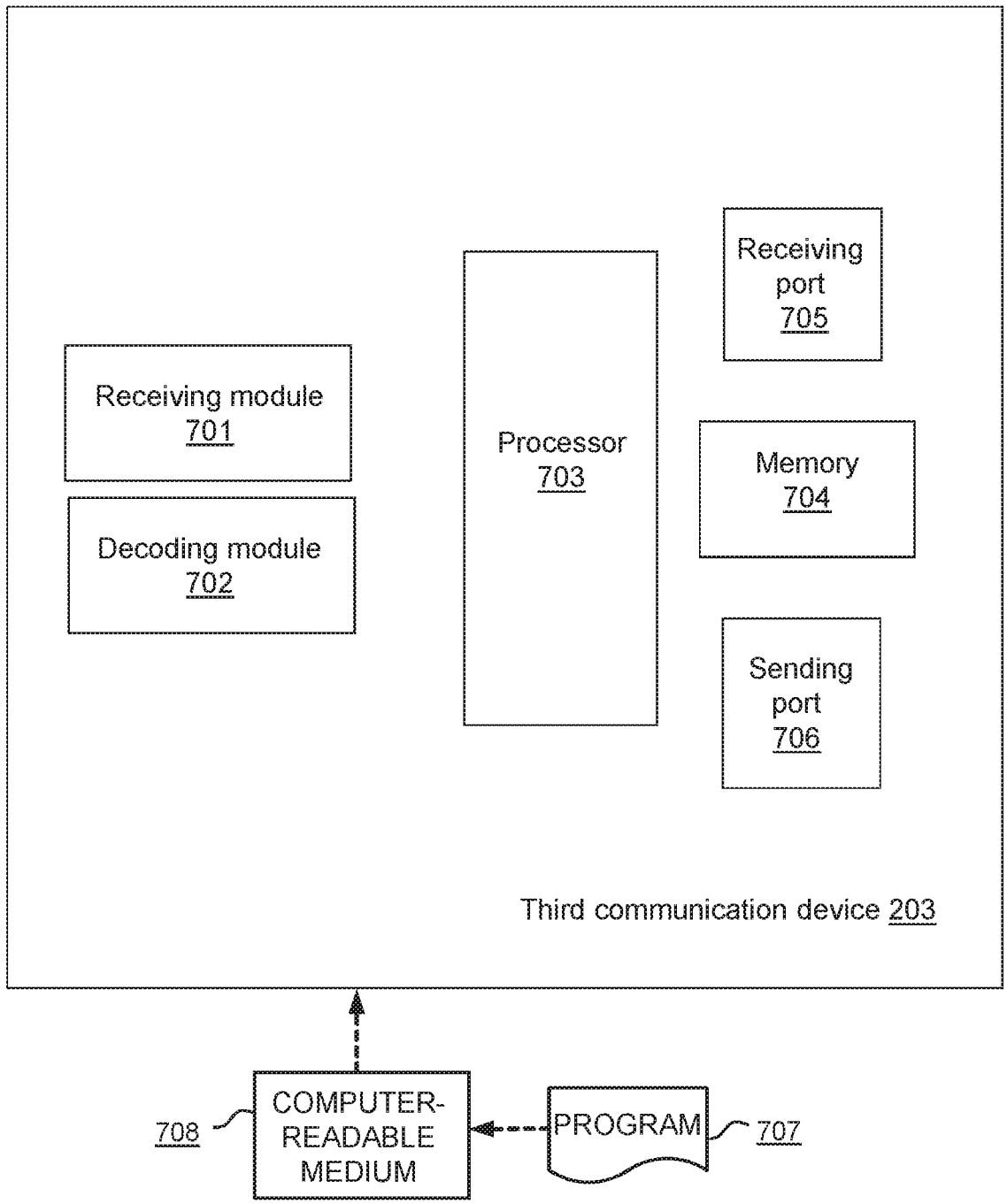
FIG. 7 is a block diagram illustrating embodiments of a third communication device, according to some embodiments.

The embodiments herein to decode radio signals configured to be received from a second communication device 202 may be implemented through one or more processors, such as the processor 703 in the third communication device 203 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the third communication device 203. One such carrier may be in the form of a CD ROM disc. It is however feasible with other data carriers such as a memory stick. The computer program code may furthermore be provided as pure program code on a server and downloaded to the third communication device 203. The computer program code may also be provided as a service from the cloud. As indicated above, the processor 703 may comprise one or more circuits, which may also be referred to as one or more modules in some embodiments, each configured to perform the actions carried out by the third communication device 203, as described above in reference to FIG. 7, e.g., the receiving module 701, and the decoding module 702. Hence, in some embodiments, the receiving module 701, and the decoding module 702 described above may be implemented as one or more applications running on one or more processors such as the processor 703.

The third communication device 203 may further comprise a memory 704 comprising one or more memory units. The memory 704 may be arranged to be used to store obtained information, such as the information received by the processor 703, store data configurations, scheduling, and applications etc, to perform the methods herein when being executed in the third communication device 203. The memory 704 may be in communication with the processor 703. Any of the other information processed by the processor 703 may also be stored in the memory 704.

In some embodiments, information e.g., from the second communication device 202 or the first communication device 201, may be received through a receiving port 705. The receiving port 705 may be in communication with the processor 703. The receiving port 705 may also be configured to receive other information.

The processor 703 may be further configured to send messages, e.g., to the second communication device 202 or the first communication device 201, through a sending port 706, which may be in communication with the processor 703, and the memory 704.

Those skilled in the art will also appreciate that the any module within the third communication device 203, e.g., the receiving module 701, and the decoding module 702 described above, may refer to a combination of analog and digital circuits, and/or one or more processors such as the processor 703 configured with software and/or firmware, e.g., stored in the memory 704, that when executed by the one or more processors such as the processor 703, perform actions as described above, in relation to FIG. 4. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Pursuant to the forgoing, the methods according to the embodiments described herein for the third communication device 203 may be respectively implemented by means of a computer program 707 product, comprising instructions, i.e., software code portions, which, when executed on at least one processor 703, cause the at least one processor 703 to carry out the actions described herein, as performed by the third communication device 203. The computer program 707 product may be stored on a computer-readable storage medium 708. The computer-readable storage medium 708, having stored thereon the computer program 707, may comprise instructions which, when executed on at least one processor 703, cause the at least one processor 703 to carry out the actions described herein, as performed by the third communication device 203. In some embodiments, the computer-readable storage medium 708 may be a non-transitory computer-readable storage medium, such as a CD ROM disc, a memory stick, or stored in the cloud space. In other embodiments, the computer program 707 product may be stored on a carrier containing the computer program, wherein the carrier is one of an electronic signal, optical signal, radio signal, or the computer-readable storage medium 708, as described above.

When using the word "comprise" or "comprising" it shall be interpreted as non-limiting, i.e., meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method of adapting transmit precoding used by one communication device for transmitting towards another communication device, the method comprising:
   obtaining Channel State Information (CSI) for a radio channel between the one communication device and the other communication device, the CSI serving as an estimate of a state of the radio channel at the beginning of a transmission interval;
   determining a precoder in dependence on the CSI; and
   transmitting a precoded radio signal over the transmission interval for the other communication device, by generating the precoded radio signal in dependence on the precoder, and accounting for the CSI becoming outdated over the transmission interval by adapting the precoder, and thereby, the precoded radio signal, one or more times during the transmission interval in dependence on an expected rate of change of the state of the radio channel,
   wherein adapting the precoder comprises changing the value of $\rho$ in the formula: $\hat{H}(\hat{H}^H\hat{H}+\rho I_K)^{-1}$, wherein:
   $\hat{H}$ is a matrix of coefficients comprising an estimate of the radio channel, as said CSI,
   $\hat{H}^H$ is the Hermitian transpose of $\hat{H}$,
   $I_K$ is an interference matrix of the other communication device,
   K denotes the other communication device, and
   $\rho$ is a scalar value.

2. The method according to claim 1, further comprising determining, as a function of the expected rate of change of the state of the radio channel, Modulation and Coding Scheme (MCS) adaptations to be used during the transmission interval by the one communication device for generating the precoded radio signal.

3. The method of claim 2, wherein the one communication device transmits multiple codewords or multiple blocks to the other communication device over the transmission interval, and wherein the MCS adaptations are determined on a per codeword or per block basis.

4. The method according to claim 1, further comprising indicating, directly or indirectly to the other communication device, the expected rate of change of the state of the radio channel, or precoding adaptations used for adapting the precoder during the transmission interval.

5. The method according to claim 1, wherein the one communication device comprises a radio network node in a Long Term Evolution (LTE) network, and wherein the transmission interval is a single Transmission Time Interval (TTI).

6. The method according to claim 1, wherein the one communication device belongs to a Long Term Evolution (LTE) network, and wherein the one communication device uses, for transmitting the precoded radio signal, beamforming with massive Multiple Input Multiple Output (MIMO).

7. The method according to claim 1, wherein the other communication device belongs to a group of other communication devices served by the one communication device, and wherein the method includes determining precoder adaptations for transmitting precoded radio signals for the group of other communication devices, for simultaneous application by the one communication device during the transmission interval.

8. The method of claim 1, wherein the one communication device comprises a radio network node of a wireless communication network, and the other communication device comprises a wireless terminal in wireless communication with the radio network node.

9. The method of claim 1, wherein the one or more adaptations of the precoder during the transmission interval accounts for aging of the CSI over the transmission interval.

10. The method of claim 9, wherein transmitting the precoded radio signal over the transmission interval for the other communication device comprises using the precoder without adaptation at the beginning of a transmit interval, and then progressively adjusting the precoder during the transmission interval at successive points within the transmission interval, to account for the aging of the CSI.

11. The method of claim 1, wherein the expected rate of change of the state of the radio channel is expressed in terms of a speed of the other communication device.

12. A communication device comprising:
   a memory storing computer program instructions; and
   processing circuitry configured to execute the computer program instructions,
   whereby the processing circuitry is configured to:
      obtain Channel State Information (CSI) for a radio channel between the communication device and another communication device, the CSI serving as an estimate of a state of the radio channel at the beginning of a transmission interval;
      determine a precoder in dependence on the CSI; and
      transmit a precoded radio signal over the transmission interval for the other communication device, by generating the precoded radio signal in dependence on the precoder and accounting for the CSI becoming outdated over the transmission interval by adapting the precoder, and, thereby, the precoded radio signal, one or more times during the transmission interval in dependence on an expected rate of change of the state of the radio channel,
      wherein the processing circuitry is configured to adapt the precoder by changing the value of $\rho$ in the formula: $\hat{H}(\hat{H}^H\hat{H}+\rho I_K)^{-1}$, wherein:
   $\hat{H}$ is a matrix of coefficients comprising an estimate of the radio channel, as said CSI,
   $\hat{H}^H$ is the Hermitian transpose of $\hat{H}$,
   $I_K$ is an interference matrix of the other communication device,
   K denotes the other communication device, and
   $\rho$ is a scalar value.

13. The communication device according to claim 12, wherein the processing circuitry is further configured to determine, as a function of the expected rate of change of the state of the radio channel, Modulation and Coding Scheme (MCS) adaptations to be used during the transmission interval by the communication device for generating the precoded radio signal.

14. The communication device of claim 13, wherein the communication device is configured to transmit multiple codewords or blocks to the other communication device over the transmission interval, and wherein the MCS adaptations are determined on a per codeword or block basis.

15. The communication device according to claim 12, wherein the processing circuitry is further configured to indicate, directly or indirectly to the other communication device, the expected rate of change of the state of the radio channel, or precoding adaptations used for adapting the precoder during the transmission interval.

16. The communication device according to claim 12, wherein the communication device is a radio network node configured for operation in a Long Term Evolution (LTE) network, and wherein the transmission interval is a single Transmission Time Interval (TTI).

17. The communication device according to claim 12, wherein the communication device belongs to a Long Term Evolution (LTE) network, and wherein the communication device is configured to use, for transmitting the precoded radio signal, beamforming with massive Multiple Input Multiple Output (MIMO).

18. The communication device according to claim 12, wherein the other communication device belongs to a group of other communication devices served by the communication device, and wherein the processing circuitry is configured to determine precoder adaptations for transmitting precoded radio signals for the group of other communication devices, for simultaneous application by the communication device during the transmission interval.

19. The communication device of claim 12, wherein the communication device comprises a radio network node of a wireless communication network, and the other communication device comprises a wireless terminal in wireless communication with the radio network node.

20. The communication device of claim 12, wherein the one or more adaptations of the precoder during the transmission interval accounts for aging of the CSI over the transmission interval.

21. The communication device of claim 20, wherein the processing circuitry is configured to use the precoder without adaptation at the beginning of the transmission interval, and then progressively adjust the precoder during the transmission interval at successive points within the transmission interval, to account for the aging of the CSI.

22. The communication device of claim 12, wherein the expected rate of change of the state of the radio channel is expressed in terms of a speed of the other communication device.

23. A radio network node configured for operation in a wireless communication network, the radio network node comprising:
    a transmitter configured for transmitting radio signals via a radio link to a User Equipment (UE);
    a receiver configured for receiving radio signals from the UE via the radio link; and
    processing circuitry operatively associated with the transmitter and the receiver, and configured to:
        determine a channel estimate representing the radio link, based on reception of a reference signal from the UE at the radio network node;
        determine a transmission configuration to be used for transmitting to the UE in a transmission interval, based on the channel estimate; and
        adapt the transmission configuration one or more times while transmitting to the UE during the transmission interval, in dependence on a known or estimated speed of the UE, to account for the channel estimate becoming outdated over the transmission interval,
        wherein the processing circuitry is configured to adapt the precoder by changing the value of $\rho$ in the formula: $\hat{H}(\hat{H}^H\hat{H}+\rho I_K)^{-1}$, wherein:
    $\hat{H}$ is a matrix of coefficients comprising an estimate of the radio channel, as said CSI,
    $\hat{H}^H$ is the Hermitian transpose of $\hat{H}$,
    $I_K$ is an interference matrix of the other communication device,
    K denotes the other communication device, and
    $\rho$ is a scalar value.

24. The radio network node of claim 23, wherein the transmission configuration comprises a transmit precoder determined from the channel estimate, the transmit precoder yielding a transmit beam used for transmitting to the UE, and wherein adapting the transmission configuration one or more times while transmitting to the UE during the transmission interval comprises widening the transmit beam one or more times during the transmission interval.

* * * * *